UNITED STATES PATENT OFFICE.

WILLIAM H. WALKER, OF NEWTON, MASSACHUSETTS.

CELLULOSE COMPOUND.

1,009,116.   Specification of Letters Patent.   Patented Nov. 21, 1911.

No Drawing. Original application filed October 23, 1905, Serial No. 284,077. Divided and this application filed September 12, 1908. Serial No. 452,776.

*To all whom it may concern:*

Be it known that I, WILLIAM H. WALKER, of Newton, county of Middlesex, State of Massachusetts, have invented an Improvement in Cellulose Compounds, of which the following is a specification.

This application is a division of my application Serial No. 284,077, filed October 23, 1905.

This invention relates to improvements in organic cellulose esters, as for example the cellulose esters of the fatty acids, such as cellulose acetate, and particuarly to the dissolving or gelatinizing of these esters by methods involving the use of new solvents and thereby changing their physical condition, resulting in the production of new and useful products. Heretofore chloroform has been the customary volatile solvent employed for the purpose, although other solvents have been suggested. The halogen substitution products of ethane and especially symmetrical tetrachlorethane or acetylenetetrachlorid are solvents for these esters and well-adapted for dissolving or gelatinizing cellulose acetate. Acetylene tetrachlorid for example, is a more powerful solvent for cellulose acetate than chloroform and its volatility is relatively low. But in order to obtain the advantages offered by the use of the halogen substitution products of ethane and especially acetylene tetrachlorid as solvents for cellulose acetate and at the same time produce a more satisfactory solution, inasmuch as it will film more quickly, I add thereto a liquid alcoholic ingredient or ingredients which are soluble or miscible therein, which alone is a non-solvent for the cellulose acetate. For example, wood alcohol, when admixed with acetylene tetrachlorid in proper proportions, will not destroy the specific solvent action of the latter upon cellulose acetate, but give the added advantage of causing the solution to film more quickly than if acetylene tetrachlorid alone is used. The addition of wood alcohol, in suitable proportions to acetylene tetrachlorid produces a mixture which is an especially powerful and useful solvent for cellulose acetate in spite of the fact that the wood alcohol alone is not a solvent; in fact the combination of wood alcohol and acetylene tetrachlorid makes a more powerful solvent of cellulose acetate than acetylene tetrachlorid alone. Thus for example, by dissolving one part of celluose acetate in ten to twelve parts by weight of acetylene tetrachlorid containing one part wood alcohol, a mixture or solution eminently suitable for varnish or lacquer is obtained which flows easily and leaves upon evaporation, in thin layers, a smooth, transparent film or coat.

It is not necessary in effecting the desired solution that the ingredients be mixed together in any particular order, as the cellulose acetate may be first impregnated with the proper quantity of wood alcohol and then with the acetylene tetrachlorid, or the cellulose acetate may be first treated with the acetylene tetrachlorid and the wood alcohol subsequently added.

Having thus described my invention, what I claim as new and desire to secure by Letters Patent is:—

1. A composition of matter, consisting of cellulose acetate and a mixture of acetylene tetrachlorid and a liquid which is soluble or miscible therein, but which alone is a non-solvent for the cellulose acetate.

2. A composition of matter, consisting of cellulose acetate, and a mixture of acetylene tetrachlorid and a liquid alcohol, which alone is a non-solvent for cellulose acetate.

3. A composition of matter consisting of cellulose acetate and a mixture of acetylene tetrachlorid and wood alcohol.

4. A solvent for organic esters of cellulose, consisting of a halogen substitution product of ethane, modified by a substance which alone is a non-solvent for the ester.

In testimony whereof, I have signed my name to this specification, in the presence of two subscribing witnesses.

WILLIAM H. WALKER.

Witnesses:
 JULIA BASS,
 EDITH L. BRETT.